Patented Oct. 8, 1929

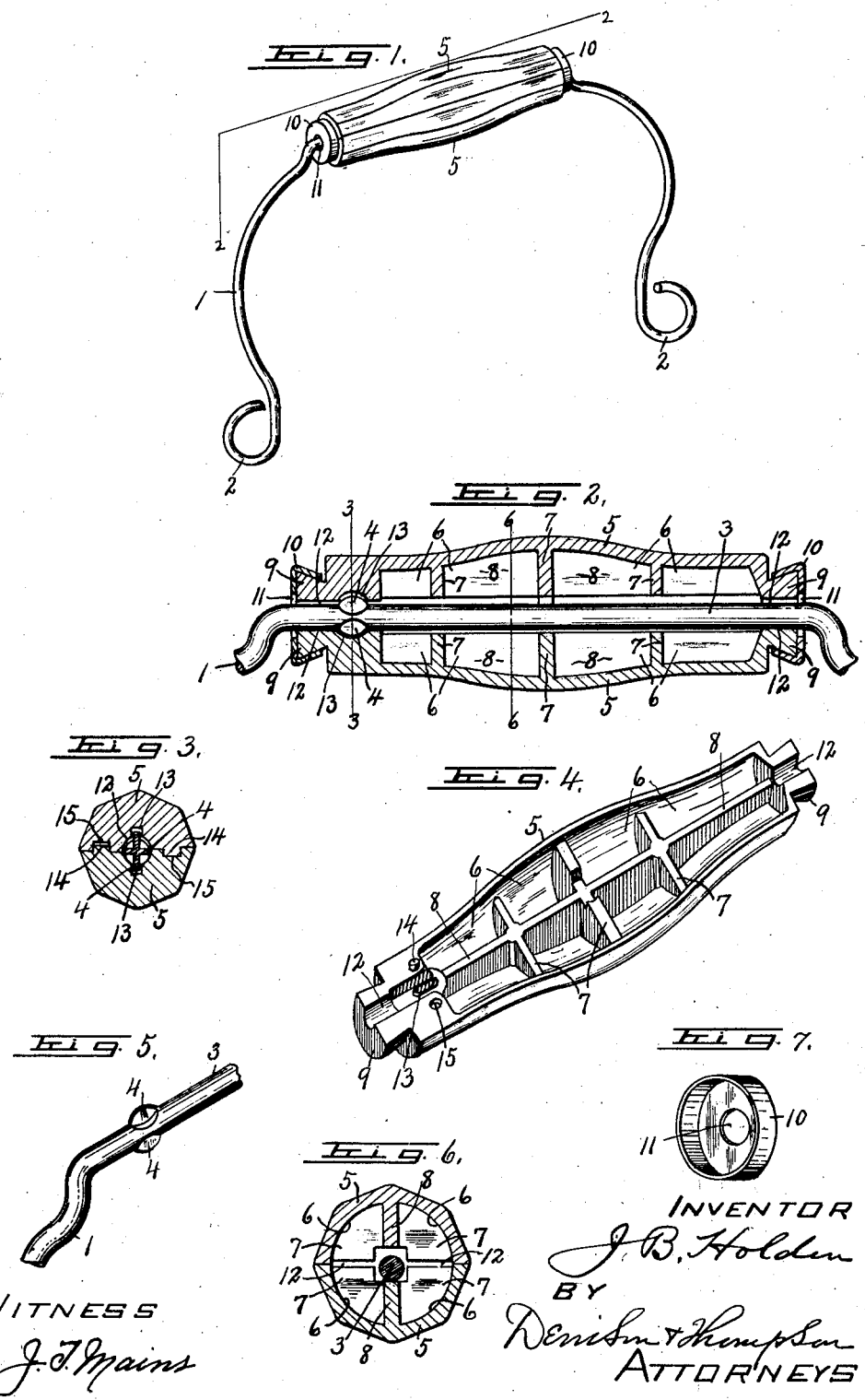

1,730,820

UNITED STATES PATENT OFFICE

JOSEPH B. HOLDEN, OF CANASTOTA, NEW YORK, ASSIGNOR TO DIEMOULDING PRODUCTION COMPANY, INCORPORATED, OF CANASTOTA, NEW YORK, A CORPORATION OF NEW YORK

BAIL HANDLE

Application filed February 11, 1928. Serial No. 253,645.

This invention relates to a bail adapted to be hinged to various forms of receptacles for carrying the same and refers more particularly to the handle and to the means for attaching the same to the medial portion of the arched member of the bail.

This arched member is usually made of wire or other heat-conducting material and the main object of the present invention is to provide a strong and durable handle of heat-insulating material capable of being more easily and quickly assembled upon the intermediate portion of the arched member of the bail than has heretofore been practised.

One of the specific objects is to make the handle in two identical half sections from moldable composition material such as bakelite meeting in the plane of the axis of the handle to embrace the intermediate portion of the arched member and capable of being cast in one and the same mold.

Another object is to taper the opposite ends of the sections toward each other and to lock the sections together by means of ferrules crimped over and upon the tapered ends to hold them against radial displacement from the arched member of the bail.

Another object is to provide cooperative means on the interior of the handle and portion of the arched member embraced thereby for holding the handle against relative turning movement on the bail proper.

Another object is to provide means for the circulation of air through the handle from end to end around the inclosed portion of the bail to reduce the transmission of heat from the bail to the handle.

Another object is to chamber the interior of the handle sections to reduce the weight thereof and to reinforce said sections by relatively thin lengthwise and transverse ribs.

Other objects and uses relating to specific parts of the bail and handle will be brought out in the following description.

In the drawings:

Figure 1 is a perspective view of a wire bail equipped with my improved handle.

Figure 2 is an enlarged longitudinal sectional view through the handle and adjacent portion of the bail taken on line 2—2, Figure 1.

Figure 3 is a transverse sectional view taken in the plane of line 3—3, Figure 2.

Figure 4 is a perspective view of one of the detached handle sections.

Figure 5 is a perspective view of a portion of the wire bail showing the fins or keys thereon for interlocking engagement with adjacent portions of the handle sections.

Figure 6 is a transverse sectional view taken in the plane of line 6—6, Figure 2.

Figure 7 is a perspective view of one of the detached locking ferrules, before being crimped upon the tapered ends of the handle sections.

In order that the invention may be clearly understood I have shown an arcuate wire bail —1— having its opposite ends provided with suitable eyes —2— adapted to be hingedly connected to a receptacle, not shown, the medial portion —3— of the wire being substantially straight and provided with diametrically opposite fins or keys —4— near one end of the straight portion for interlocking engagement in suitable recesses in the handle sections, presently described.

The handle is hollow and of approximately the length of the straight portion —3— of the wire bail —1— and comprises two opposed half sections —5— identical in construction and preferably made of a composition of heat insulating material such as bakelite having flat inner faces which, when assembled, meet in the plane of the axis of the handle to embrace and completely surround the adjacent straight portion —3— of the wire bail.

The sections —5— are chambered at —6— from their meeting faces outwardly throughout the major portions of their lengths and relatively short distances from their ends to reduce the weight of the handle so that the outer walls of the intermediate portions of the sections are relatively thin but strong and durable and are reinforced by transverse ribs —7— and central lengthwise ribs —8— integrally united to the transverse ribs and to the end walls of the chambers.

The object in making the half sections of the handle identical in construction is that they may be cast or formed in one and the same mold. The opposite ends —9— of the sections —5— are reduced in radial depth and tapered inwardly toward each other and when the sections are assembled form what may be termed inwardly tapering cones for receiving sheet metal ferrules —10— which are continuous circumferentially, as shown in Figure 7 and have their marginal edges crimped over and upon the inwardly tapered peripheries of the heads —9— to firmly lock the sections to each other and upon the straight portion —3— of the wire bail —1— against relative radial movement, as shown more clearly in Figure 2.

The bases of the ferrules —10— are arranged to abut against the outer end faces of the heads —9— and are provided with central circular openings —11— of greater diameter than the adjacent portions of the bail —1— to permit the circulation of air therethrough along the straight portion of the bail and into the interiors of the sections —5—.

For the same purpose the opposite ends of the sections are provided with semi-circular recesses —12— of greater radius than that of the adjacent portions of the bail —1— to establish communication between the openings —11— and interior chambers —6— of the sections —5— thereby allowing the air to circulate through the handle for cooling purposes.

One end of each section —5— is provided with a key way or groove —13— for receiving the adjacent fins or keys —4— on the adjacent portion —3— of the bail to hold the handle against relative turning movement and also against axial movement on the bail.

Each of the sections —5— is provided near one end preferably adjacent the key ways —13— with a boss —14— and a corresponding socket —15— arranged uniform distances from the axis of the handle upon the adjacent faces of the sections and also uniform distances from the outer end of the handle so that when the handle sections are brought together face to face the boss on each section will enter the socket of the other section to hold said sections against relative radial or axial movement.

The inner faces or edges of the ribs —7— and —8— are also disposed in spaced relation to the periphery of the adjacent portion of the bail —1— to further facilitate the passage of air through the handle when the sections are assembled and locked in place upon the bail by the ferrules —10—, as shown more clearly in Figure 6, the object being to reduce the transmission of heat from the metal bail to the handle.

While I have shown the perimeter of the handle as octagonal and of greater diameter in the center than at the ends for convenience in handling or rather to prevent slipping of the handle in the hand of the user, it is evident that it may be made circular or various other cross sectional forms without departing from the spirit of this invention.

What I claim is:

1. A hollow bail-handle comprising opposed similar half sections, each having its meeting face provided with a boss and a complementary socket at equal distances from and at opposite sides of the axis and also equal distances from one end of the handle so that the boss of each section will enter the socket of the other section to hold the sections against relative axial movement when the sections are brought together face to face and means for holding the sections against radial displacement when adjusted for use.

2. The combination with an arcuate wire bail having its intermediate portion substantially straight and one end of the straight portion provided with oppositely projecting radial fins, of a handle composed of opposed half-sections meeting in the plane of the axis of the straight portion of the bail to embrace the same and having their ends reduced and tapered toward each other, the adjacent sides of said sections being provided with key ways for receiving said fins, and ferrules crimped over and upon said tapered ends to lock the sections together on said straight portion of the bail.

3. A bail handle as in claim 2 in which the meeting sides of the sections are provided with air chambers extending the major portions of their lengths for reducing their weight and for cooling purposes, said sections having integral internal transverse ribs in spaced relation for reinforcing purposes.

In witness whereof I have hereunto set my hand this 7th day of February, 1928.

JOSEPH B. HOLDEN.